United States Patent [19]
Kato et al.

[11] Patent Number: 6,098,765
[45] Date of Patent: Aug. 8, 2000

[54] ROTARY DAMPER

[75] Inventors: Hiroshi Kato; Mitsuo Sasaki; Fumiyuki Yamaoka, all of Kanagawa, Japan

[73] Assignee: Unisia Jecs Corporation, Atsugi, Japan

[21] Appl. No.: 09/202,565

[22] PCT Filed: May 11, 1998

[86] PCT No.: PCT/JP98/02056

§ 371 Date: Dec. 17, 1998

§ 102(e) Date: Dec. 17, 1998

[30] Foreign Application Priority Data

May 12, 1997  [JP]  Japan ................................... 9-120714
Aug. 29, 1997  [JP]  Japan ................................... 9-233476

[51] Int. Cl.[7] ................................................ F16D 57/00
[52] U.S. Cl. ................................... 188/290; 188/307
[58] Field of Search .............................. 188/290, 308, 188/306, 307, 295, 296, 297

[56] References Cited

U.S. PATENT DOCUMENTS 2,028,164  1/1936  Peo ............................................ 188/308
2,678,115  5/1954  Loe ........................................... 188/296
5,305,858  4/1994  Haga et al. .......................... 188/296 X
5,810,129  9/1998  Hanawa et al. .......................... 188/308

FOREIGN PATENT DOCUMENTS 3-96727  4/1991  Japan .
9-72368  3/1997  Japan .
9-96330  4/1997  Japan .

*Primary Examiner*—Robert J. Oberleitner
*Assistant Examiner*—Melanie Talavera
*Attorney, Agent, or Firm*—Foley & Lardner

[57] ABSTRACT

A rotary damper includes: a pressure generating mechanism portion A for relatively pivoting swingable vanes 4a and 4b with respect to stationary vanes 2a and 2b located on a casing 1 so as to vary reverse proportionally a pressure of a fluid filled within two pressure chambers 5a, 5b, 6a, and 6b; and a damping force generating mechanism portion B which limits a movement of the fluid based on a pressure variation generation at the pressure generating mechanism portion A to generate the damping force. A first transmission mechanism portion C and a second transmission mechanism portion D are interposed between both mechanism portions A and B, each of the first and second transmission mechanism portions C and D being capable of moving the fluid and transmitting the fluid pressure via movable first bellows 12 and second bellows 13. The fluid having a viscosity at least higher than the fluid filled in the flow passage located in the damping force generating mechanism portion B is used as the fluid filled in both of the pressure chambers 5a, 5b, 6a, and 6b in the pressure generating mechanism portion A.

12 Claims, 9 Drawing Sheets

ROTARY DAMPER

1. Technical Field

The present invention relates to a rotary damper used in a vehicular suspension system for generating a suspension force (damping force) against an external input in its pivotal direction.

2. Technical Background

A Japanese Patent Application First (Tokkai) Publication No. Heisei 3-96727 exemplifies a conventional rotary damper.

In the conventional rotary damper, a stationary vane and a swingable vane are disposed within a casing. Two pressure chambers are defined between the stationary vane and the swingable vane, the two pressure chambers being communicated via a bypass circuit. In the bypass circuit, a first circuit including a check valve and a damping valve and a second circuit including another damping valve and another check valve are disposed in parallel to each other.

Hence, when the swingable vane is pivoted, an oil within one of the pressure chambers is caused to flow into the other pressure chamber via the damping valve. However, due to a resistance when the damping valve is opened, a differential pressure between both pressure chambers is generated and, due to the differential pressure, the suspension force (damping force) is acted upon the pivotal movement of the swingable vane.

However, in the conventional rotary damper described above, both pressure chambers are disposed at portions nearest to an axial core portion of a pivotal axis and oil pressures of both pressure chambers become high and a sealing characteristic on a slide surface between the casing and the swingable vane becomes extremely difficult.

When a considerably high damping force is generated, a leakage of oil is increased and their internal pressure cannot be higher.

That is to say, a leakage Q [cm³/s] in a gap is generally expressed as the leakage $Q(=b \cdot h^3/12 \mu \cdot L) \cdot (P_1-P_2)+(b \cdot h)/U$ - - - (1).

In the equation (1), $(P_1-P_2)$ denotes a pressure difference, $\mu$ denotes a fluid viscosity, h denotes a gap, U denotes a movement velocity of a lower plate, b denotes a width of a flat plate, and L denotes a length of the gap h.

As appreciated from the equation (1), when the pressure difference $(P_1-P_2)$ is enlarged to generate the high damping force, the leakage Q is so large that a predetermined damping force characteristic cannot be achieved.

There are conceivably two methods to reduce the leakage Q: ① a reduction in the gap length h; or ② an increase in the fluid viscosity $\mu$.

However, since a high dimensional accuracy is required for a sealing portion in order to ① reduce the gap length h, a working cost is accordingly increased.

In addition, ② when an oil having a high fluid viscosity $\mu$ is used, a throttling at the damping valve portion provides a laminar stream throttling due to the presence in the high viscosity oil so that a temperature characteristic is worsened and a variation rate in the damping force characteristic due to the variation in temperature becomes large.

With the above-described conventional problems in mind, it is an object of the present invention to provide a rotary damper which can suppress a working cost to be lowered without requirement of a high dimensional accuracy in a seal portion and which can reduce the characteristic variation of the damping force due to the temperature variation.

DISCLOSURE OF THE INVENTION

The above-described object can be achieved by providing a rotary damper comprising: a pressure generating mechanism portion including a casing, a stationary vane fixed on an inner peripheral surface of the casing, and a pivotably installed swingable vane, at least one pair of pressure chambers being defined and formed between the stationary vane and the pivotably installed swingable vane so that when a volume of one of the pressure chambers is increased due to a pivotal movement of the swingable vane, the volume of the other pressure chamber is decreased, and within which a fluid is filled; a damping force generating mechanism portion including damping force generating means, interposed in a midway through a flow passage in which the fluid is filled, for restricting a fluid circulation in at least one direction of the flow passage so as to develop a damping force; a first transmission mechanism portion, interposed between one of the pressure chambers in the pressure generating mechanism portion and one end of the flow passage in the damping force generating mechanism portion, for transmitting a movement of the fluid and a pressure of the fluid via a movable partitioning wall; and a second transmission mechanism portion, interposed between one of the pressure chambers in the pressure generating mechanism portion and the other end of the flow passage in the damping force generating mechanism portion, for transmitting the movement of the fluid and the pressure of the fluid via the movable partitioning wall, and wherein the fluid having a viscosity at least higher than that of the fluid filled in the flow passage located in the damping force generating mechanism portion is used as the fluid filled within both of the pressure chambers in the pressure generating mechanism portion.

In addition, in the rotary damper according to the present invention, fluidible solid particles are used as the fluid filled in both of the pressure chambers in the pressure generating mechanism portion.

Furthermore, in the rotary damper according to the present invention, a diaphragm is used as the movable partitioning wall.

In addition, in the rotary damper according to the present invention, a free piston is used as the movable partitioning wall.

Furthermore, in the rotary damper according to the present invention, a bellows is used as the movable partitioning wall.

Furthermore, in the rotary damper according to the present invention, a volume compensating mechanism portion is disposed in the flow passage in the damping force generating mechanism portion so as to perform a volume compensation of the fluid due to a temperature variation.

Furthermore, in the rotary damper according to the present invention, the damping force generating mechanism portion includes a first circuit portion having first damping force generating means, interposed in the midway through the fluid passage in which the fluid is filled, for restrictively allowing only the fluid circulation toward the one direction so as to generate a predetermined damping force and a first check valve, disposed in parallel to the first damping force generating means, for allowing only the fluid communication in the direction opposite to the allowed fluid flow communication direction by the first damping force generating means; and a second circuit portion including second damping force generating means for restrictively allowing only the fluid communication into a direction opposite to the fluid allowed circulation direction in the first damping force generating means so as to generate the predetermined damping force and a second check valve, disposed in parallel to the second damping force generating means, for allowing only the fluid communication in a direction opposite to the allowed circulation direction in the second damping force generating means, the first circuit portion, the second circuit portion being connected in series with each other.

In addition, in the rotary damper according to the present invention, partitioning wall deflection correcting means is provided for correcting a positional deflection of the movable partitioning wall.

Furthermore, in the rotary damper according to the present invention, the partitioning wall deflection correcting means is constituted by an elastic body arranged so that the deflected partitioning wall is returned to a steady state position.

Furthermore, in the rotary damper according to the present invention, the elastic body is arranged on both sides of the movable partitioning wall.

In addition, in the rotary damper according to the present invention, a generated damping force characteristic in the first damping force generating means at the damping force generating mechanism portion is different from that in the second damping force generating means.

In the rotary damper according to the present invention, the elastic body is disposed on the partitioning wall faced toward the damping force generating means and interposed in the flow passage between the first damping force generating means or the second damping force generating means whose generated damping force characteristic is lower than the other and the pressure generating mechanism portion and is disposed on the partitioning wall faced toward the pressure generating mechanism portion and interposed in the flow passage between one of the first or second damping force generating means whose generated damping force is higher than the other and the pressure generating mechanism portion.

Hence, in the rotary damper according to the present invention, when the swingable vane is relatively pivoted to the stationary vane, the fluid within one of the pressure chambers located in the pivoting direction is pressurized and the fluid within the other pressure chamber located in a direction opposite to the pivoting direction is decreased. Hence, the variation in the relative pressure in the respective pressure chambers and the movement in the fluid based on the relative pressure variations are transmitted to both ends of the fluid passage in the damping force generating mechanism portion via the movement of the partitioning wall of the first transmission mechanism and the second transmission mechanism, respectively.

In the damping force generating mechanism portion, the fluid communication generated within the fluid passage on the basis of the movement in the respective partitioning wall is limited by means of the damping force generating mechanism portion. Hence, a differential pressure (pressure difference) between the respective pressure chambers is developed and this pressure difference causes the pivotal movement of the swingable vane to generate a predetermined damping force.

As described above, the partitioning walls located at the first transmission mechanism and located at the second transmission mechanism portion serve to be blocked between each pressure chamber of the pressure generating mechanism portions and both ends of the flow passage in the damping force generating mechanism portion.

Hence, it is possible to fill different kinds of fluids in each pressure chamber of the pressure generating mechanism portion and in the flow passage of the damping force generating mechanism. It is noted that since a high viscosity oil is filled in each pressure chamber of the pressure generating mechanism portion, a leakage can be reduced without requirement of a high dimensional accuracy on a sealing part. Consequently, a high hermetical sealing characteristic can be maintained with a working cost suppressed to be lowered. In addition, since a low viscosity oil is filled in the fluid passage of the damping force generating mechanism portion, the flow passage limited by the damping force generating means provides a turbulence throttling so that the generated damping force generated with respect to a variation in the oil viscosity with respect to the variation in temperature is not affected by the flow passage.

Therefore, the variation in the damping force characteristic can be reduced.

In addition, according to the rotary damper, the difference in the damping force characteristic occurs depending on the direction in which the swingable vane is pivoted.

Even when the leakage of the fluid occurs between both mutual pressure chambers, the partitioning bias correcting means always corrects the bias of the partitioning walls. Consequently, a generation of such a trouble that the partitioning walls are deflected in either direction so that the pivotal movement of the swingable vane is locked can be prevented.

Furthermore, the elastic body disposed on both sides of the partitioning walls serves always to correct the bias of the partitioning wall against the leakage of the fluid from either pressure chamber side.

According to the rotary damper, only two individual elastic bodies can correct the bias of the partitioning walls, the two elastic bodies being disposed on one of the partitioning walls which is faced toward the damping force generating mechanism portion and which is interposed in the flow passage between one of the first damping force generating means and the second damping force generating means whose generated damping force characteristic is lower and the pressure generating mechanism portion and which is interposed in the flow passage between either one of the first and second damping force characteristic is higher and the pressure generating mechanism portion.

BEST MODE FOR CARRYING OUT THE INVENTION

Preferred embodiment of a rotary damper according to the present invention will be explained with reference to the accompanied drawings.

(First Preferred Embodiment)

Figure 1:
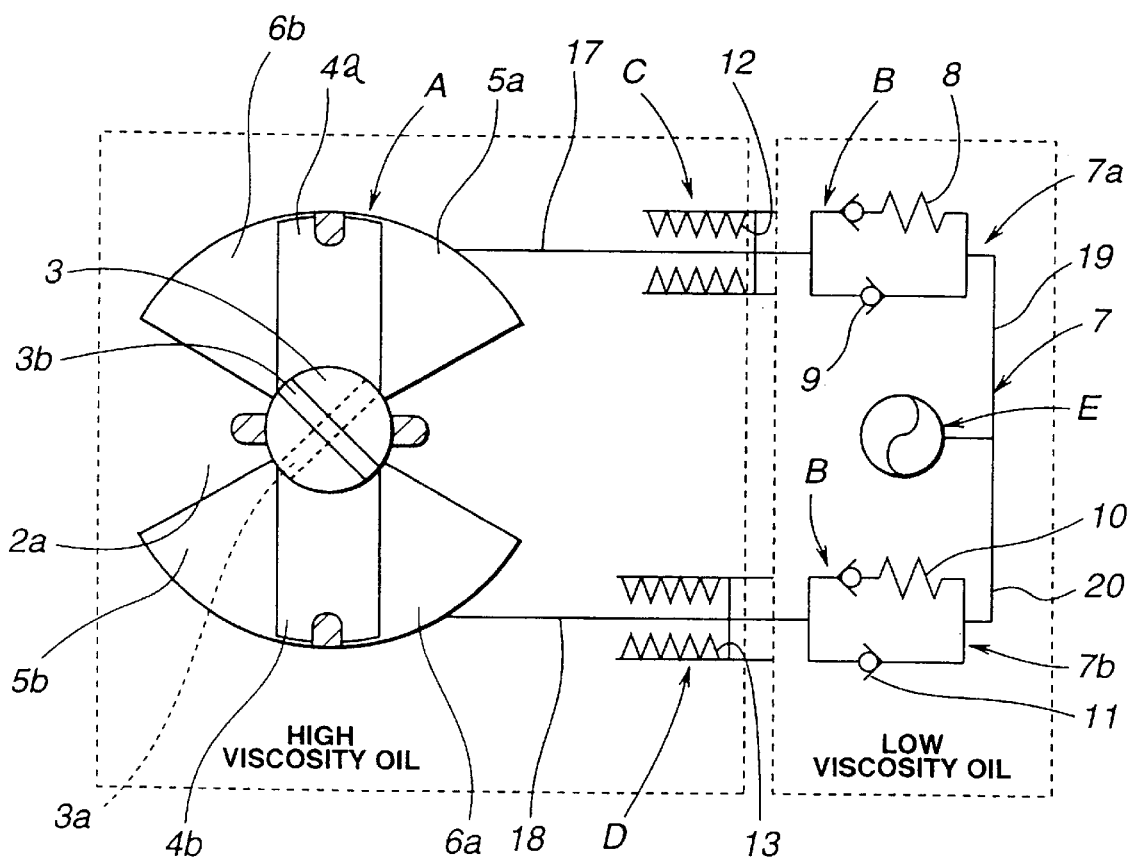
FIG. 1 is a schematic diagram for explaining mainly a hydraulic pressure circuit structure from a rotary damper in a first preferred embodiment according to the present invention.

FIG. 1 shows a rough view for explaining mainly a hydraulic circuit structure of the rotary damper in a first preferred embodiment according to the present invention. As shown in FIG. 1, the rotary damper includes: a pressure generating mechanism portion A; a damping force generating mechanism portion B; a first transmission mechanism portion C; a second transmission mechanism portion D; and a volume compensation mechanism portion E.

Figure 2:
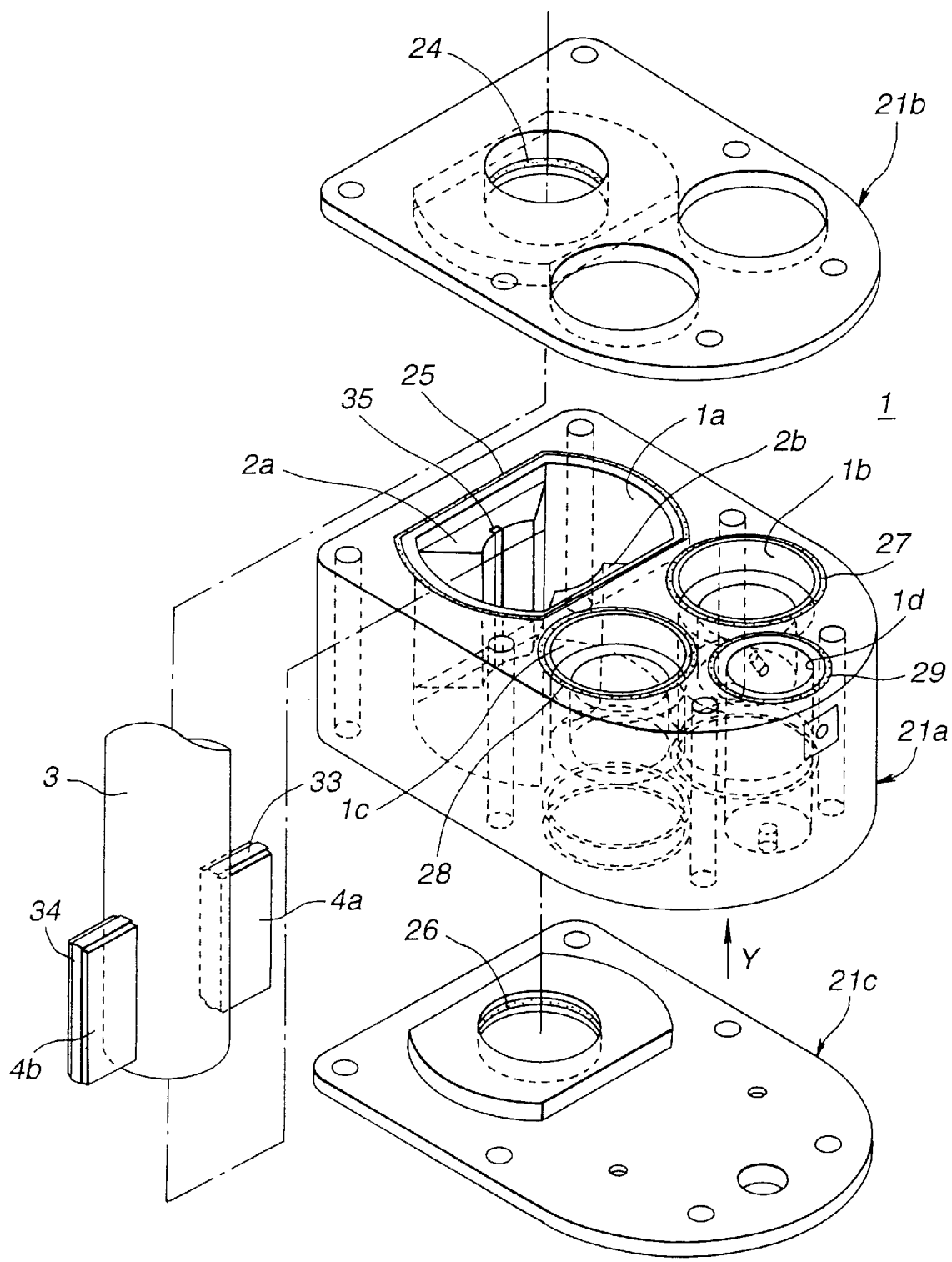
FIG. 2 is an exploded view of a casing in which an internal assembly member in the rotary damper in the first preferred embodiment according to the present invention is omitted.
Figure 3:
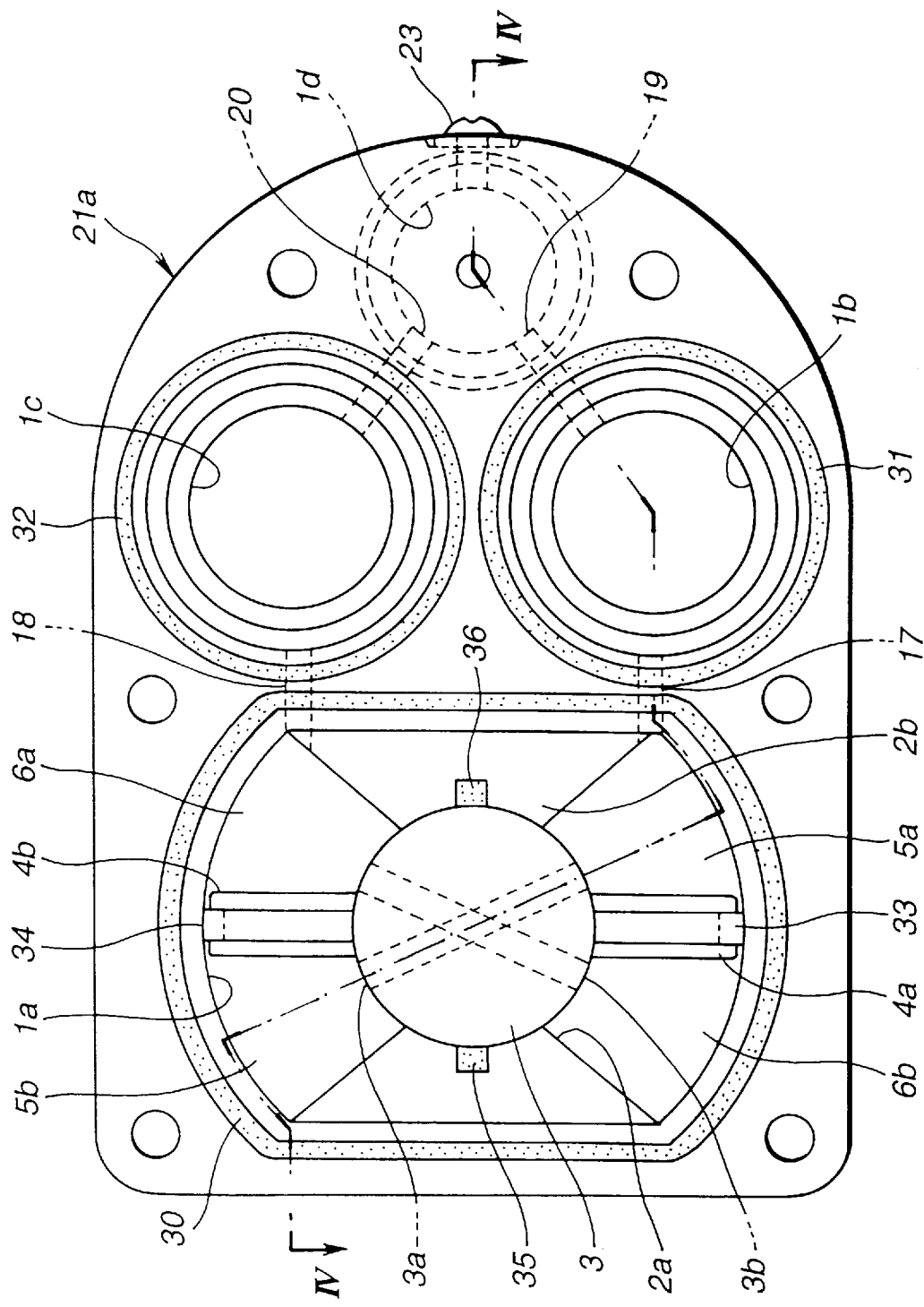
FIG. 3 is an arrow-marked directional view in a Y direction shown in FIG. 2.
Figure 4:
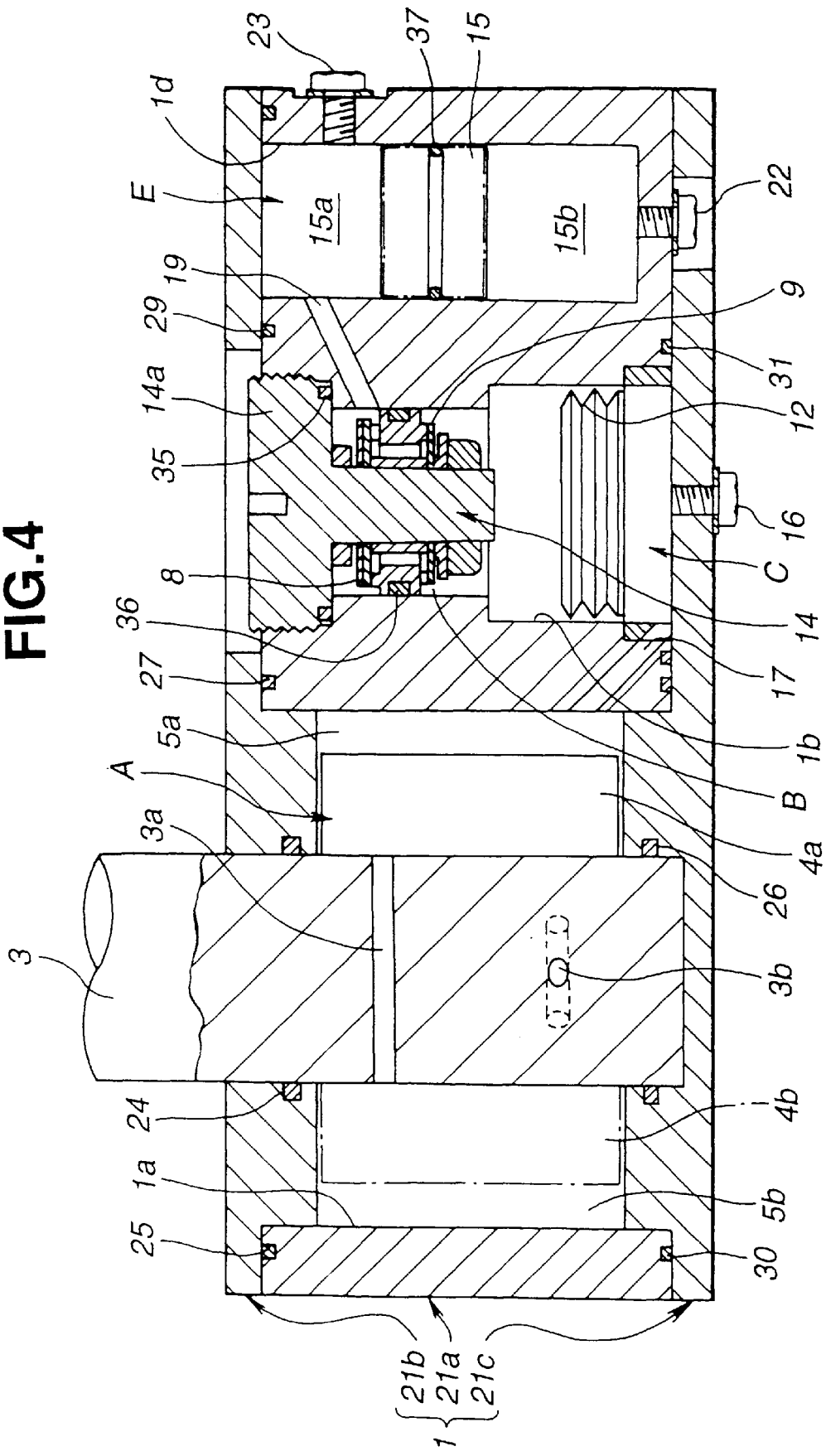
FIG. 4 is a longitudinally cross sectional view cut away along a line of IV—IV in FIG. 3.

The pressure generating mechanism portion A is, as shown in FIGS. 2 through 4, provided with two stationary vanes 2a and 2b integrally formed on a casing 1 and two sheets of swingable vanes 4a and 4b pivotable about a pivotable shaft 3.

First pressure chambers 5a and 5b and second pressure chambers 6a and 6b are defined and formed between the stationary vanes 2a and 2b whose inner pressures are varied in reverse proportion to a pivotal movement of the swingable vanes 4a and 4b.

A high viscosity oil is filled within the respective pressure chambers 5a, 5b, 6a, and 6b.

Either a first communication hole 3a or a second communication hole 3b is linked between both of the second pressure chambers 6a and 6b, the first pressure chambers 5a and 5b and the second pressure chambers 6a and 6b being penetrated radially through the pivotable shaft 3.

The damping force generating mechanism portion B, as shown in FIG. 1, includes: a first circuit portion 7a; and a second circuit portion 7b connected in series with the first circuit portion 7a, the first and second circuit portions 7a and 7b having a fluid passage 7 filled with a fluid (low viscosity oil).

A first damping valve (first damping force generating means) 8 for restrictively allowing only a fluid flow circulation toward an uni-direction in the fluid flow passage 7 so as to generate a predetermined damping force and a first check valve 9 disposed in parallel to the first damping valve 8 for restrictively allowing only the fluid flow circulation toward an opposite direction to the fluid flow allowed circulation direction at the above-described first damping valve 8 are interposed in the above-described first circuit portion 7a.

A second damping valve (second damping force generating means) 10 for restrictively allowing only the fluid communication in the opposite direction in the first damping valve 8 so as to generate the predetermined damping force and a second check valve 11 for allowing only the fluid communications opposite to the allowed fluid communication direction at the second damping valve 10 are interposed in the second circuit portion 7b.

The above-described first transmission mechanism portion C includes, as shown in FIG. 1, a first bellows (movable partitioning wall) 12 interposed between the first pressure chamber 5a in the above-described pressure generating mechanism portion A and one end of the flow passage 7 at the damping force generating mechanism portion B, a movement and a fluid pressure of the high viscosity oil at the first pressure chamber 5a and the low viscosity oil at the first pressure chamber 5a and the low viscosity oil at the first circuit portion 7a being enabled to be transmitted indirectly via the first bellows 12.

The second transmission mechanism portion D includes, as shown in FIG. 1, a second bellows (movable partitioning wall) 13 interposed between the second pressure chamber 6a at the above-described pressure generating mechanism portion A and the other end of the fluid flow passage 7 at the damping force generation mechanism portion B, movement and fluid passages of the high viscosity oil of the fluid passage 7 at the second circuit portion 7b being enabled to be transmitted indirectly via the second bellows 13.

The above-described volume compensation mechanism portion E serves to compensate for the variation in the coil volume due to a variation in temperature and is interposed in the fluid flow passage 7 between the fist circuit portion 7a and the second circuit portion 7b.

Next, a specific structure of the rotary damper in the first preferred embodiment according to the present invention will be described with reference to FIGS. 2 through 4.

FIG. 2 shows an exploded view of the casing in which an internal assembly member is omitted. FIG. 3 is an arrow-marked directional view in a Y direction shown in FIG. 2. FIG. 4 is a longitudinally cross sectional view cut away along a line IV—IV shown in FIG. 3.

A pressure generating mechanism portion A, a damping force generating mechanism portion B, a first transmission mechanism portion C, and a second transmission mechanism portion D, in the rotary damper in the first preferred embodiment according to the present invention are, as shown in FIGS. 2 through 4, integrally incorporated into a casing That is to say, as shown by the exploded view of the casing 1 in which the internal assembly member is omitted, the casing 1 includes a casing main frame portion 21a and upper and lower casing lid portions 21b and 21c. The upper and lower casing lid portions 21b and 21c are fastened by means of bolts and nuts not shown onto both upper and lower surfaces of the casing 1.

A penetrating hole 1a is formed on the casing main frame portion 21a to form the pressure generating mechanism portion A, two penetrating holes 1b and 1c are formed on the casing main frame portion 21a to form the damping force generating mechanism portion B and the first and second transmission mechanism portions C and D, and a hole 1d is formed thereon to form the volume compensation mechanism portion E.

As shown in FIG. 4, a damping valve body 14 having a first damping valve 8 and a first check valve 9 is attached onto an opening end of an upper surface of the penetrating hole 1b defining upper and lower penetrating holes 1b. A head 14a of the damping valve body 14 serves to close the opening end of the upper surface of the penetrating hole 1b. In addition, the first bellows 12 is incorporated onto the lower end of the penetrating hole 1b. The first bellows 12 serves to define the penetrating hole 1b in upper and lower directions. A low viscosity oil is filled in an upper side of the first bellows 12 and a high viscosity oil is filled in a lower side of the first bellows 12. An air vent pipe 16 located at the side of the high viscosity oil is installed on the lower casing lid portion 21c which faces against the opening portion of the lower end of the penetrating hole 1b It is noted that a second damping valve 10, a second check valve 11, and a second bellows 13 are incorporated in the same manner as described above into the penetrating hole 1c.

Communication passages 17 and 18 provide communications between the lower side of the first bellows 12 and the first pressure chamber 5 and between the lower part of the second bellows 13 in the penetrating hole 1c and the second pressure chamber 6a.

In addition, due to the assembly of the upper casing lid portion 21b with respect to the casing main frame portion 21a, an upper opening end of the hole 1d is closed and a free piston 15 slidably incorporated within the hole 1d serves to form the volume compensation mechanism portion E defined by an oil chamber 15a in which the low viscosity oil is filled and a gas chamber 15b in which a gas is sealed.

Flow passages 19 and 20 serve to communicate between the oil chamber 15a and an upper side of the damping valve body 14 at the penetrating holes 1b and 1c.

A gas-filled valve 22 is installed on a bottom end of the gas chamber 15b and an air vent valve 23 is installed on a side wall surface of the oil chamber 15a.

It is noted that, in FIGS. 2 through 4, numerals 24 through 37 denote seal members.

Next, an action of the rotary damper in the first preferred embodiment will be described with reference to the schematic diagram of FIG. 1.

First, when the pivotable shaft 3 and swingable vanes 4a and 4b are relatively pivoted in a clockwise direction with respect to the casing 1 on which the stationary vanes 2a and 2b are integrally mounted, the fluid within the first pressure chambers 5a and 5b which are in the pivot direction side is pressurized (pressure is increased) and the fluid within the second pressure chambers 6a and 6b which are in an opposite direction to the pivot direction is de-pressurized (pressure is decreased).

The relative pressure variation and the fluid movement based on the relative pressure variation in the first and second pressure chambers 5a, 5b, 6a, and 6b cause the first bellows 12 in the first transmission mechanism portion C to be pressed and moved in a rightward direction of FIG. 1b via the flow passages 17 and 18 and, simultaneously, cause the second bellows 13 in the second transmission mechanism portion C to be attracted and moved in a leftward direction via the flow passages 17 and 18, respectively.

Hence, the relative pressure variation in the first and second pressure chambers 5a, 5b, 6a, and 6b and the fluid movement based on the relative pressure variation described above are transmitted to both ends of the flow passage 7 at the damping force generating mechanism portion B.

At the damping force generating mechanism portion B, a passage of the fluid generated within the fluid based on the movement of the first bellows 12 and second bellows 13 is limited by the first damping valve 8. A differential pressure between the first and second pressure chambers 5a, 5b, 6a, and 6b is generated and this differential pressure generates a predetermined damping force for the pivotal movement of the swingable vanes 4a and 4b in the clockwise direction as viewed from FIG. 1.

On the contrary, when the pivotable shaft 3 and swingable vanes 4a and 4b are relatively pivoted in the counterclockwise direction with respect to the casing 1 in which the stationary vanes 2a and 2b are integrally mounted, the fluid within the second pressure chambers 5a and 5b which are in the pivoting direction is pressurized (the pressure is increased) and the fluid within the first pressure chambers 5a and 5b which are opposite to the pivoting direction is de-pressurized (pressure is decreased).

The relative pressure variation of the first and second pressure chambers 5a, 5b, 6a, and 6b and the fluid movement based on the relative pressure variation cause the second bellows 13 of the second transmission mechanism portion D to be pressed and moved in the leftward direction as viewed from FIG. 1 via the fluid passages 17 and 18 and, simultaneously, cause the fluid bellows 12 of the first transmission mechanism portion to be attracted and moved in the leftward direction. Hence, the relative pressure variation and the movement of the fluid based on the relative pressure variation are transmitted to both ends of the fluid passage 7 at the damping force generating mechanism portion B.

Then, the fluid communication of the fluid generated within the flow passage 7 based on the movements of the first bellows 12 and second bellows 13 is limited by the second damping valve 10 and, therefore, the differential pressure generates a predetermined damping force for the pivotal movement in the counterclockwise direction as viewed from FIG. 1 of the swingable vanes 4a and 4b.

As described above, in the rotary damper in the first preferred embodiment according to the present invention, the leakage can be reduced without requirement of the high dimensional accuracy in the sealing portion by filling the high viscosity oil in the respective pressure chambers 5a, 5b, 6a, and 6b at the pressure generating mechanism portion A. Hence, the working cost can be suppressed to be lowered and the high hermetic sealing characteristic can be maintained.

In addition, when a fluid streaming through a given gap generally has a Reynolds number below 2300, the fluid stream gives a laminar air flow and, when equal or above 2300, a turbulence air flow occurs. As the viscosity of the fluid is increased under the same stream velocity and the same throttling area in a flow passage limited by a certain damping force generating means, the Leynolds number is reduced.

Hence, a relationship between a flow quantity Q and a differential pressure $\Delta P$ when the flow passage limited by the damping force generating means provides the laminar air flow is expressed in the following equation (2).

The relationship between the fluid flow quantity Q and the differential pressure $\Delta P$ when the flow passage provides the turbulence air flow is expressed in the following equation (3).

$$Q = b\ h^3/12\ \mu L\ \Delta P \qquad (2)$$

$$Q = cd\ \sqrt{2g/r}\ b\ h\ \sqrt{\Delta P} \qquad (3)$$

It is noted that in the equations (2) and (3) Q denotes the flow quantity flowing into the limited fluid flow passage, $\Delta P$ denotes a differential pressure between upstream and downstream positions in the limited flow passage, b denotes a width in a cross sectional area of the limited flow passage, h denotes a height of the cross sectional area of the limited flow passage, L denotes a length of the cross sectional area of the limited flow passage, $\mu$ denotes the viscosity of the oil, cd denotes a flow quantity coefficient, and r denotes a relative weight of the oil.

When the flow passage limited by the damping force generating means provides the laminar air flow, a term of the oil viscosity μ is included in the equation (3) so that the flow quantity is varied according to the oil viscosity.

When the flow passage limited by the damping force generating means provides the turbulence air flow, the term of the oil viscosity μ is note included in the equation (3) so that the flow quantity is not dependent on the oil viscosity.

As described above, when the low viscosity oil whose Leynolds number is equal to or above 2300 is filled in the flow passage 7 of the damping force generating mechanism portion B, the flow passage limited by the damping force generating means provides the turbulence throttling so that the generated damping force is not affected by the variation in the oil viscosity with respect to the temperature variation. Hence, the variation in the damping force characteristic can be reduced.

Since the flow passage 7 at the damping force generating mechanism portion B is provided with the first damping value 8 for restrictively allowing the fluid communication only in the single direction to generate the predetermined damping force and the second damping valve for restrictively allowing the fluid communication only in a direction opposite to the fluid communication direction by means of the fluid communication direction by means of the first damping valve 8 to generate the predetermined damping force, the different damping forces can be generated according to the pivoting direction of the swingable vanes 4a and 4b.

(Second Preferred Embodiment)

Figure 5:
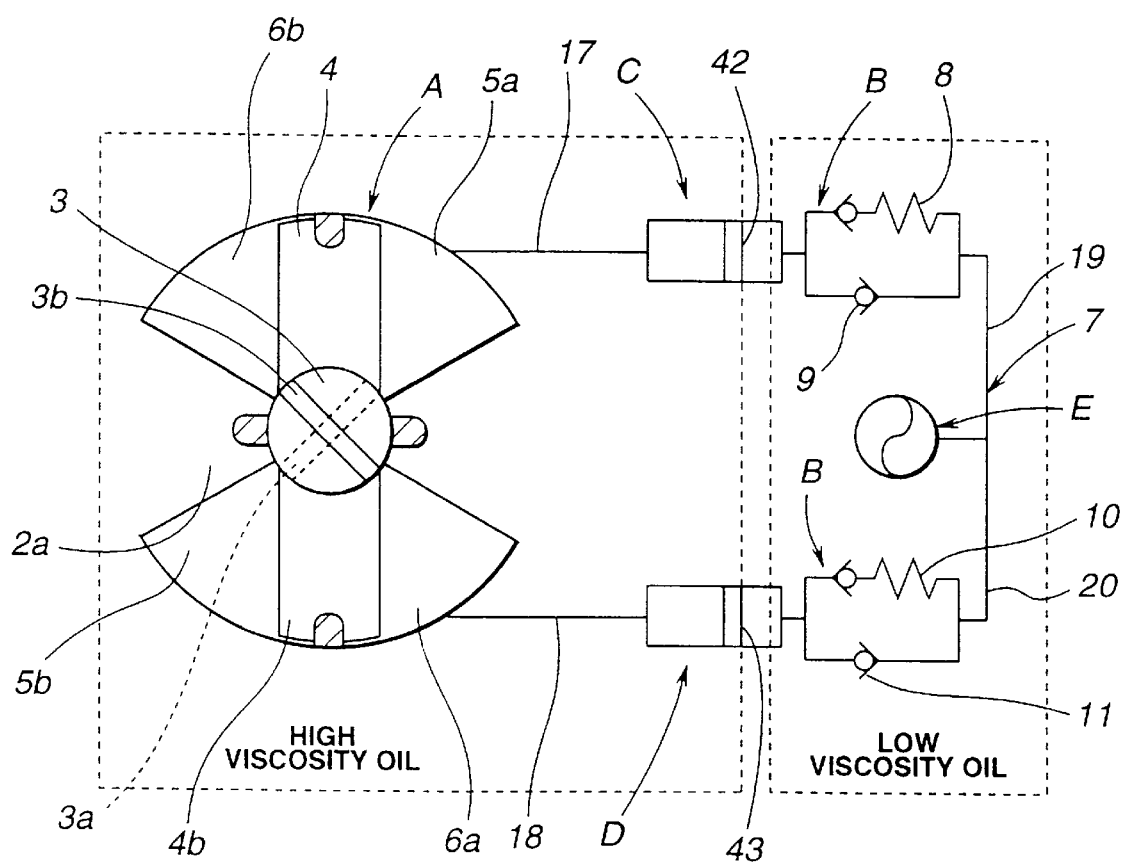
FIG. 5 is a schematic diagram for explaining mainly a hydraulic pressure circuit structure from the rotary damper in a second preferred embodiment according to the present invention.

FIG. 5 shows the schematic diagram for explaining the rotary damper in a second preferred embodiment according to the present invention, mainly the hydraulic circuit structure.

As shown in FIG. 5, the rotary damper in the second preferred embodiment includes a first free piston 42 and a second free piston 43 in place of the first bellows 12 and the second bellows 13 in the first preferred embodiment which serves as movable positioning walls of the first transmission mechanism portion C and the second transmission mechanism portion D.

The generated damping force characteristic of the second damping valve 10 is higher than the first damping valve 8. The other structure is approximately the same as the first preferred embodiment according to the present invention.

Hence, the same reference numerals as those in the first embodiment designate the like elements in the second embodiment and the explanation thereof will be omitted herein. The explanation on the difference points will hereinafter be made.

Figure 6:
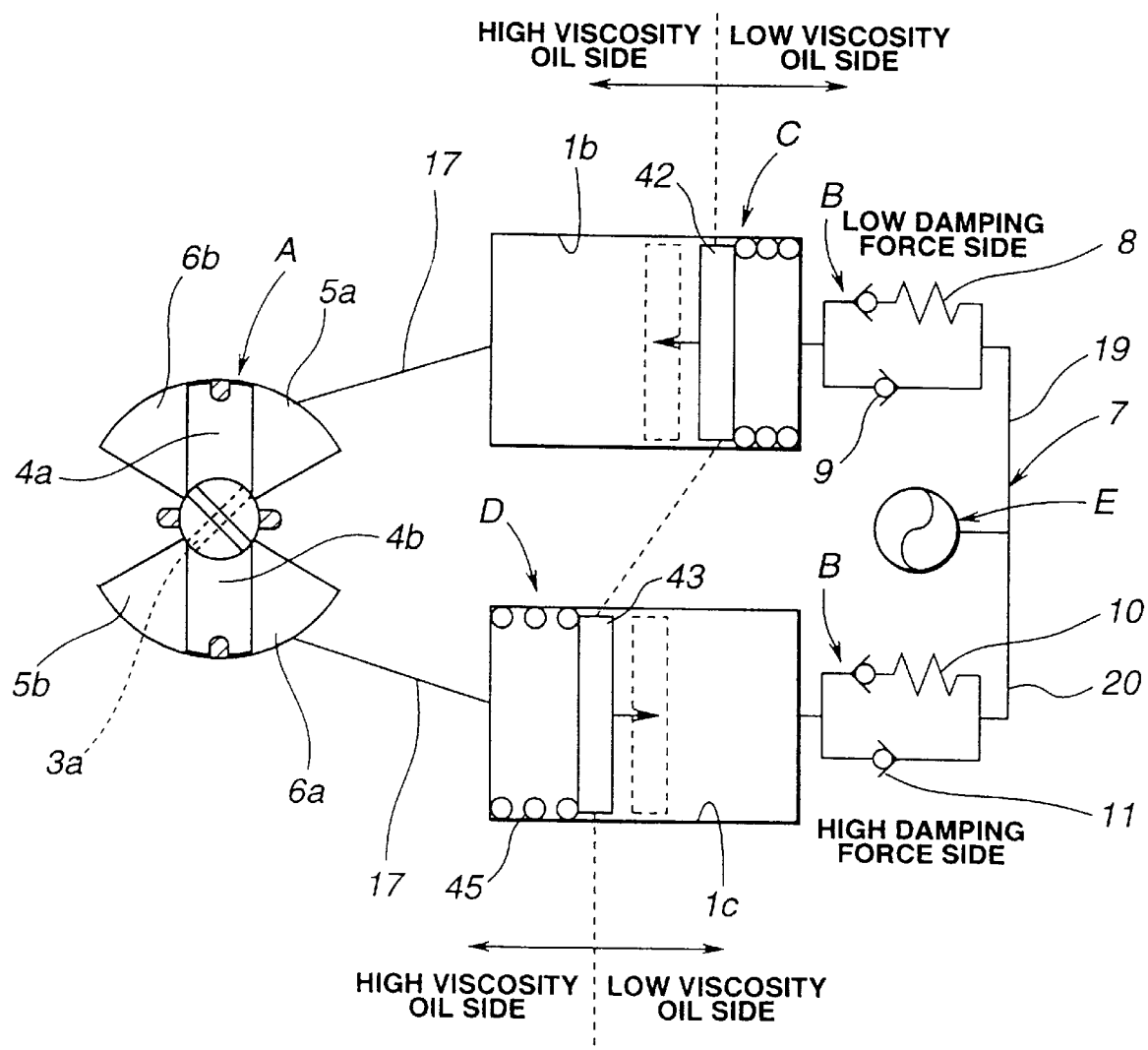
FIG. 6 is a partially detailed and schematic view for explaining mainly the hydraulic pressure circuit and its action from the rotary damper in the second preferred embodiment according to the present invention.

As shown in the partially detailed schematic diagram of FIG. 6, the first transmission mechanism portion C includes: a first free piston (movable partitioning wall) 42 interposed between the first pressure chamber 5a at the pressure generating mechanism portion A and the other end of the flow passage 7 at the damping force generating mechanism portion B having the first damping valve 8 located at the low damping force side and the first coil spring (partitioning bias correcting means) 44 disposed at the damping force generating mechanism portion B.

The movements of the high viscosity oil at the first pressure chamber 5a and of the low viscosity oil at the flow passage 7 at the first circuit portion 7a and the fluid pressure thereof are indirectly communicable via the first free piston 42.

The second transmission mechanism portion D includes: a second free piston (movable partitioning wall) 43 interposed between the second pressure chamber 6a at the pressure generation mechanism portion A and the other end of the flow passage 7 located in the damping force generating mechanism portion B having the second damping valve 10 at the high damping force side and the second coil spring (partitioning wall bias correcting means) 45 disposed on the second pressure chamber 6a.

Then, the movement and fluid pressure of the high viscosity oil at the second pressure chamber 6a and of the low viscosity oil at the flow passage 7 located at the second circuit portion 7b are arranged so as to enable a mutual transmission indirectly via the second free piston 43.

Next, a specific structure of the first transmission mechanism portion C and the second transmission mechanism portion D will be explained with reference to the longitudinally cross sectioned views of FIGS. 7 and 8.

Figure 7:
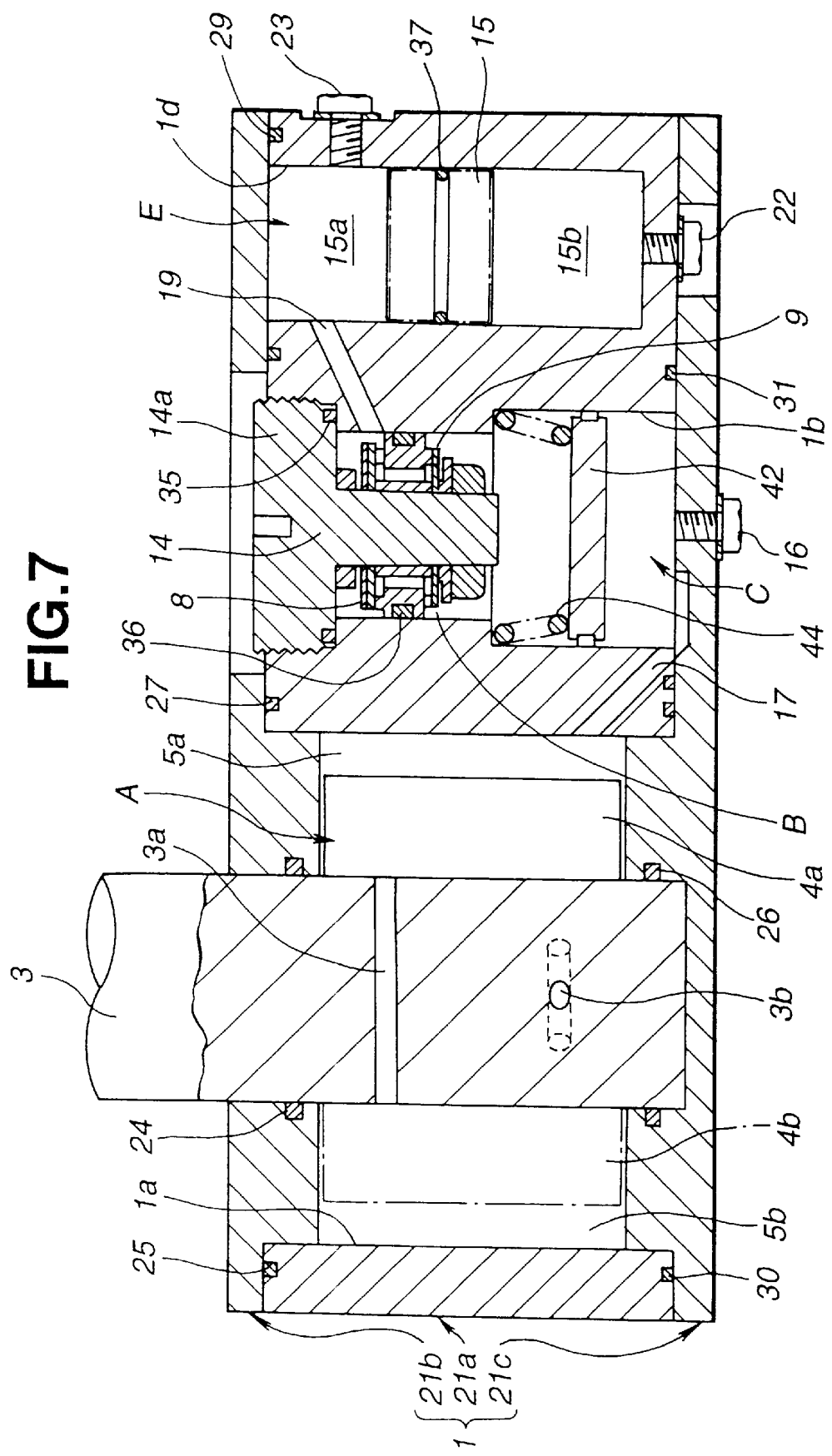
FIG. 7 is a longitudinally cross sectional view of the rotary damper in the second preferred embodiment according to the present invention which is cut away along a line IV—IV in FIG. 3 to cut out a first transmission mechanism portion.

FIG. 7 is a longitudinally cross sectioned view cut away along a line of IV—IV cutting the first transmission mechanism portion C in FIG. 3.

Figure 8:
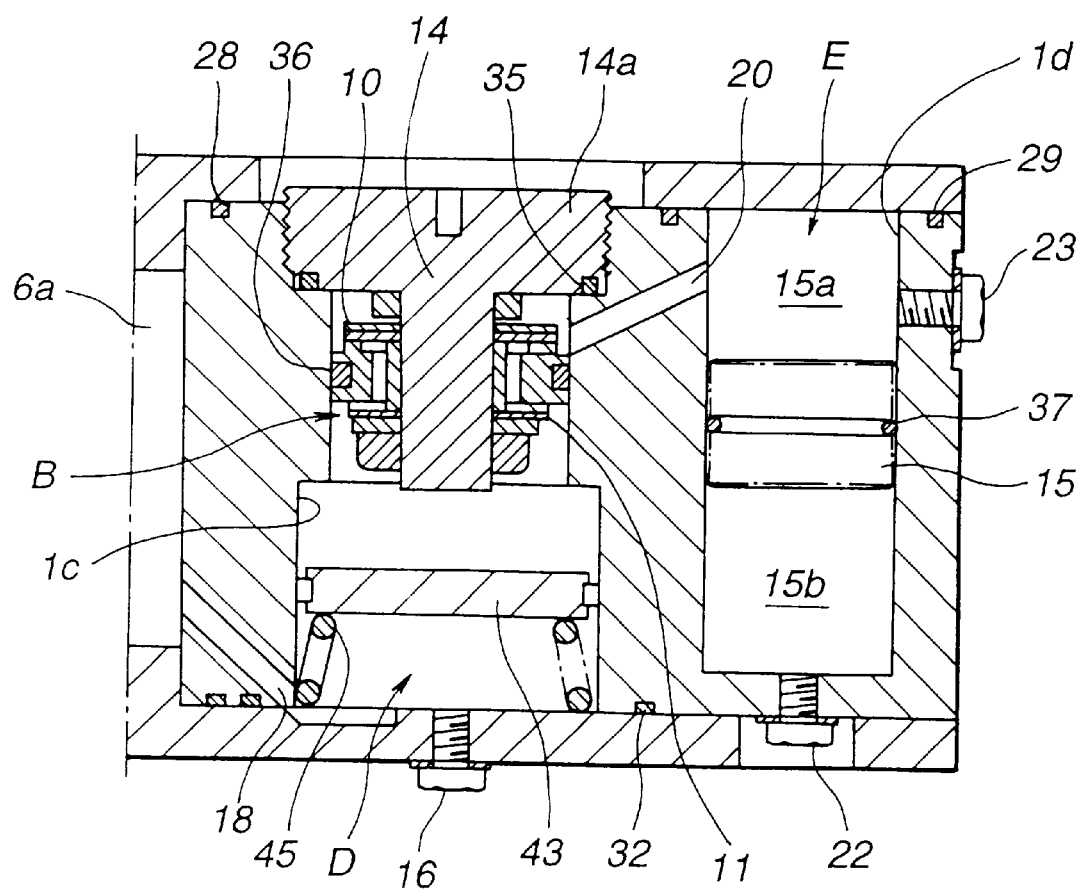
FIG. 8 is a longitudinally cross sectional view of a second transmission mechanism portion in the rotary damper in the second preferred embodiment according to the present invention.

FIG. 8 is a longitudinally cross sectional view at the second transmission mechanism portion D.

First, in the first transmission mechanism portion C, as shown in FIG. 7, the first free piston 42 is slidably housed with the penetrating hole 1b as a cylinder in a lower end portion of the penetrating hole 1b.

The first free piston 42 serves to define vertically the hole 1b. The low viscosity oil is filled at the upper part of the first free piston 42 and the high viscosity oil is filled at the lower part thereof.

A first coil spring 44 is housed which returns the first free piston 42 to its steady state position.

Next, in the second transmission mechanism portion D, the second free piston 43 is slidably housed with the penetrating hole 1c as the cylinder in the lower end portion of the penetrating hole 1c. The second free piston 43 serves to define vertically the penetrating hole 1c. The low viscosity oil is filled at the upper side of the second free piston 43 and the high viscosity oil is filled at the lower side of the second free piston in which the high viscosity oil is filled.

A second coil spring 45 is housed in the lower side in which the high viscosity oil is filled which returns the second free piston 43 to its steady state position.

Next, an action of the rotary damper in the second embodiment will be described with reference to FIG. 6.

Since, in the rotary damper in the second embodiment according to the present invention, as described above, the generated damping force characteristic of the second damping valve 10 is set to be higher than that of the first damping valve 8 and the difference in the damping force characteristics occurs depending on the pivoting direction of the swingable vanes 4a and 4b, the leakage of the high viscosity oil from the first pressure chambers 5a and 5b toward the second pressure chambers 6a and 6b becomes increased more than the leakage of the high viscosity oil from the second pressure chambers 6a and 6b toward the first pressure chambers 5a and 5b. Hence, when the pivotal movements of the swingable vanes 4a and 4b is repeated, a difference in a quantity of the high viscosity oil between the first pressure chambers 5a and 5b and that in the second pressure chambers 6a and 6b occurs. Consequently, as shown in FIG. 6, with the swingable vanes 4a and 4b placed at swing center positions, both of the first free piston 42 and the second free piston 43 are deflected from the steady-state position denoted by dotted lines of FIG. 6 toward deflected position denoted by solid lines of FIG. 6.

In the second preferred embodiment according to the present invention, when the swingable vanes 4a and 4b are placed at their swing center positions, a repulsive force caused by compressions of the first coil spring 44 and the second coil spring 45 arranged respectively at the reflected sides causes a force such that the first free piston 42 and the second free piston 43 are pressed and returned to the steady state positions and returned to the steady state positions denoted respectively by the dotted lines to be acted thereupon. This causes the differential pressure to be generated between the first pressure chambers 5a and 5b and the second pressure chambers 6a and 6b. A high viscosity oil leakage from the first pressure chambers 5a and 5b toward the second pressure chambers 6a and 6b occurs. Hence, the difference in the high viscosity oil quantity between the first pressure chambers 5a and 5b and the second pressure chambers 6a and 6b can gradually be eliminated. The first free piston 42 and the second free piston 43 can be returned to the steady state position denoted by the dotted lines.

As described above in details, in the rotary damper in the second embodiment according to the present invention, such a trouble that the pivotal movements of the swingable vanes 4a and 4b are locked due to the deflections of the first free piston 42 and the second free piston 43 can be prevented from occurring.

In addition, since the coil spring is installed only on either the first free piston 42 or the second free piston 43, the increase in the manufacturing cost can be suppressed to be lowered.

Furthermore, since the partitioning walls are constituted by the free pistons 42 and 43, the durability can be improved since the free piston itself has no deformation as is different from the bellows and the diaphragm.

(Third Preferred Embodiment)

Figure 9:
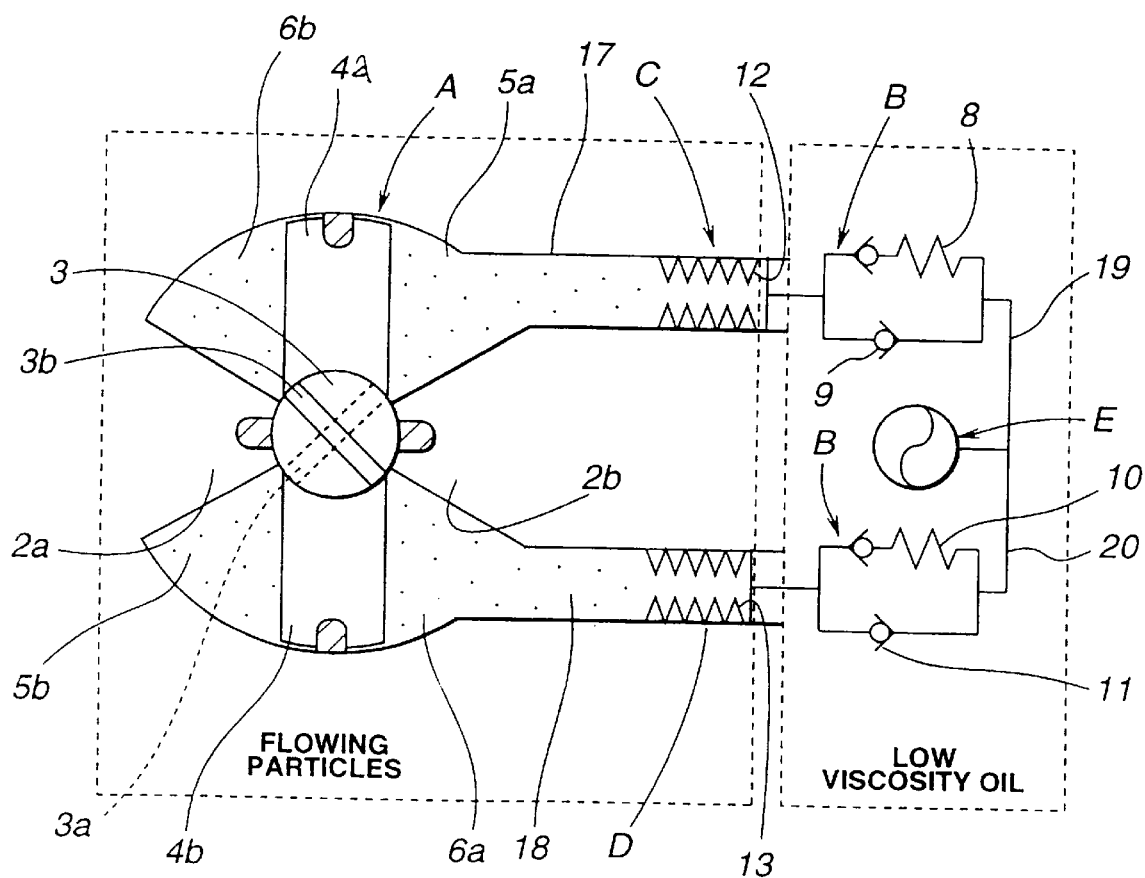
FIG. 9 is a schematic view for explaining mainly the hydraulic pressure circuit structure in the rotary damper in a third preferred embodiment according to the present invention.

Next, FIG. 9 shows a schematic diagram for explaining mainly the hydraulic pressure circuit in the rotary damper in a third preferred embodiment according to the present invention.

As shown in FIG. 8, in the rotary damper in the third preferred embodiment according to the present invention, as the fluid filled at the first and second pressure chambers 5a, 5b, 6a, and 6b in the pressure generating mechanism portion A, fluidible solid particles are used. The other structure of the rotary damper is generally the same as described in the first embodiment.

In the third embodiment according to the present invention, the fluidible solid particles themselves can be enlarged more than the gaps between the casing and the swingable vanes so that the leakage can approximately be zeroed.

Although the rotary damper in each of the first, second, and third embodiments has been described above, the present invention is not limited to each of these embodiments but includes the design modification without departing from the scope of the present invention.

For example, the bellows in each of the first and second embodiments may be constituted by the elastic member but may be constituted by metallic bellows to improve the durability.

In addition, the rotary damper according to the present invention, the partitioning walls may be constituted by diaphragm(s).

In this case, since it is not necessary to form in a very complicated shape, the diaphragm(s) can be more inexpensive than the bellows.

As described hereinabove, in the rotary damper according to the present invention, the fluid of the different kinds of fluids between each pressure chamber in the pressure generating mechanism portion and the fluid passage side of the damping force generating mechanism portion can be filled. Hence, since the high viscosity oil can be filled in each pressure chamber of the pressure generating mechanism portion, the oil leakage can be reduced without necessity of a high dimensional accuracy in the sealing portion. Consequently, the working cost can be suppressed to be lowered and the high hermetic sealing characteristic can be maintained.

In addition, since the low viscosity oil is filled at the flow passage of the damping force generating mechanism portion, the flow passage limited by the damping force generating means provides the turbulence throttling and the generated damping force is not affected by the variation in the oil viscosity with respect to the temperature variation. Hence, the variation in the damping force characteristic can be reduced.

In addition, since the partitioning wall deflection correcting means for correcting the deflection in the partitioning wall(s) is installed, the difference in the damping force characteristic depending upon the pivoting direction of the swingable vanes occurs. Even if the leakage in the fluid between the respective pressure chambers occurs, the deflection in the partitioning walls is always corrected. Consequently, such an inconvenience that the partitioning walls are deflected to either sides so that the pivotal movements in the swingable vanes are locked can be prevented from occurring.

Furthermore, since the elastic body is arranged on both sides of the partitioning wall(s), the deflection of the partitioning wall(s) can always be corrected even if the fluid leakage from either or both of the first and second pressure chambers occurs.

In addition, since the elastic body is arranged on the side surface of the partitioning wall interposed in the flow passage between one of the first and second damping force generating means whose generated damping force is lower than the other and the pressure generating mechanism portion and the elastic body is arranged on the side surface of the partitioning wall interposed in the flow passage between one of the first and second damping force generating means whose generated damping force characteristic is higher than the other and the pressure generating mechanism portion, only these two elastic bodies can correct inexpensively the deflections of the partitioning walls.

Industrial Utility Possibility

The present invention relates to a rotary damper used in a suspension system of an automotive vehicle and is applicable to the vehicular suspension system which generates the damping force according to a vehicular running condition and a road surface condition so as to achieve a suspension action.

What is claimed is:

1. A rotary damper, comprising:
   a pressure generating mechanism portion including a casing, a stationary vane fixed on an inner peripheral surface of the casing, and a pivotably installed swingable vane, at least one pair of pressure chambers being defined and formed between the stationary vane and the pivotably installed swingable vane so that when a volume of one of the pressure chambers is increased due to a pivotal movement of the swingable vane, the volume of the other pressure chamber is decreased, and within which a fluid is filled;
   a damping force generating mechanism portion including damping force generating means, interposed in a midway through a flow passage in which the fluid is filled, for restricting a fluid circulation in at least one direction of the flow passage so as to develop a damping force;
   a first transmission mechanism portion, interposed between one of the pressure chambers in the pressure generating mechanism portion and one end of the flow passage in the damping force generating mechanism portion, for transmitting a movement of the fluid and a pressure of the fluid via a movable partitioning wall; and a second transmission mechanism portion, interposed between one of the pressure chambers in the pressure generating mechanism portion and the other end of the flow passage in the damping force generating mechanism portion, for transmitting the movement of the fluid and the pressure of the fluid via the movable partitioning wall, and wherein the fluid having a viscosity at least higher than that of the fluid filled in the flow passage located in the damping force generating mechanism portion is used as the fluid filled within both of the pressure chambers in the pressure generating mechanism portion.

2. A rotary damper as claimed in claim 1, wherein fluidible solid particles are used as the fluid filled in both of the pressure chambers in the pressure generating mechanism portion.

3. A rotary damper as claimed in claim 1, wherein a diaphragm is used as the movable partitioning wall.

4. A rotary damper as claimed in claim 1, wherein a free piston is used as the movable partitioning wall.

5. A rotary damper as claimed in claim 1, wherein a bellows is used as the movable partitioning wall.

6. A rotary damper as claimed in claim 1, wherein a volume compensating mechanism portion is disposed in the flow passage in the damping force generating mechanism portion so as to perform a volume compensation of the fluid due to a temperature variation.

7. A rotary damper as claimed in claim 1, wherein the damping force generating mechanism portion includes a first circuit portion having first damping force generating means, interposed in the midway through the fluid passage in which the fluid is filled, for restrictively allowing only the fluid circulation toward the one direction so as to generate a predetermined damping force and a first check valve, disposed in parallel to the first damping force generating means, for allowing only the fluid communication in the direction opposite to the allowed fluid flow communication direction by the first damping force generating means; and a second circuit portion including second damping force generating means for restrictively allowing only the fluid communication into a direction opposite to the fluid allowed circulation direction in the first damping force generating means so as to generate another predetermined damping force and a second check valve, disposed in parallel to the second damping force generating means, for allowing only the fluid communication in a direction opposite to the allowed circulation direction in the second damping force generating means, the first circuit portion and the second circuit portion being connected in series with each other.

8. A rotary damper as claimed in claim 1, which further comprises a partitioning wall deflection correcting means for correcting a positional deflection of the movable partitioning wall.

9. A rotary damper as claimed in claim 8, wherein the partitioning wall deflection correcting means is constituted by an elastic body arranged so that the deflected partitioning wall is returned to a steady state position.

10. A rotary damper as claimed in claim 1, wherein an elastic body is arranged on both sides of the movable partitioning wall.

11. A rotary damper as claimed in claim 7, wherein a generated damping force characteristic in the first damping force generating means at the damping force generating mechanism portion is different from that in the second damping force generating means.

12. A rotary damper as claimed in claim 11, wherein an elastic body is disposed on the partitioning wall faced toward the damping force generating means and interposed in the flow passage between the first damping force generating means or the second damping force generating means whose generated damping force characteristic is lower than the other and the pressure generating mechanism portion and is disposed on the partitioning wall faced toward the pressure generating mechanism portion and interposed in the flow passage between one of the first or second damping force generating means whose generated damping force is higher than the other and the pressure generating mechanism portion.

* * * * *